(12) United States Patent
Sommers

(10) Patent No.: US 10,733,088 B1
(45) Date of Patent: Aug. 4, 2020

(54) METHODS, SYSTEMS, AND COMPUTER READABLE MEDIA FOR TESTING A NETWORK NODE OR A RELATED APPLICATION PROGRAMMING INTERFACE USING SOURCE CODE METADATA

(71) Applicant: Keysight Technologies, Inc., Santa Rosa, CA (US)

(72) Inventor: Christian Paul Sommers, Bangor, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 16/290,426

(22) Filed: Mar. 1, 2019

(51) Int. Cl.
G06F 11/36 (2006.01)

(52) U.S. Cl.
CPC ...... *G06F 11/3688* (2013.01); *G06F 11/3684* (2013.01)

(58) Field of Classification Search
CPC .................. G06F 11/3684; G06F 11/3688
See application file for complete search history.

(56) References Cited

U.S. PATENT DOCUMENTS

| | | | | |
|---|---|---|---|---|
| 7,272,822 | B1* | 9/2007 | Riggins | G06F 9/451 717/124 |
| 8,028,276 | B1 | 9/2011 | Bessonov | |
| 8,402,435 | B1 | 3/2013 | Spiro | |
| 9,891,898 | B1 | 2/2018 | Tonsing | |
| 10,164,829 | B1 | 12/2018 | Watson et al. | |
| 10,225,381 | B1 | 3/2019 | Bosshart | |
| 10,587,491 | B1* | 3/2020 | Volpe | H04L 43/0894 |
| 2006/0168205 | A1 | 7/2006 | Barron et al. | |
| 2006/0259629 | A1* | 11/2006 | Usmani | G06F 11/3688 709/227 |
| 2009/0112505 | A1 | 4/2009 | Engel et al. | |
| 2012/0033678 | A1 | 2/2012 | Page et al. | |
| 2014/0157245 | A1 | 6/2014 | Krueger | |
| 2015/0088827 | A1 | 3/2015 | Xu et al. | |
| 2015/0172208 | A1 | 6/2015 | DeCusatis et al. | |

(Continued)

FOREIGN PATENT DOCUMENTS

CN 107749802 A 3/2018

OTHER PUBLICATIONS

Radek et al., "Verification of Generated RTL from P4 Source Code" (Year: 2018).*

(Continued)

*Primary Examiner* — Phillip H Nguyen

(57) ABSTRACT

According to one method, the method occurs at a network equipment test device. The method includes receiving source code metadata derived from one or more source code files for programming a packet forwarding plane of a network node; analyzing the source code metadata to generate test metadata, wherein analyzing the source code metadata to determine the test metadata includes identifying source code metadata portions that indicate elements to test and determining the test metadata based on the elements; generating, using the test metadata, one or more test plans for testing the network node or an application programming interface (API) associated with the network node; and testing the network node or the API using the one or more test plans.

20 Claims, 6 Drawing Sheets

(56) References Cited

U.S. PATENT DOCUMENTS

| | | | |
|---|---|---|---|
| 2015/0234725 A1* | 8/2015 | Cillis | G06F 11/263 |
| | | | 714/33 |
| 2015/0365325 A1 | 12/2015 | Hwang et al. | |
| 2016/0234087 A1 | 8/2016 | Nyerges et al. | |
| 2016/0234089 A1 | 8/2016 | Kimura et al. | |
| 2017/0093986 A1 | 3/2017 | Kim et al. | |
| 2017/0237632 A1 | 8/2017 | Hegde et al. | |
| 2017/0322873 A1 | 11/2017 | Morris | |
| 2018/0210823 A1 | 7/2018 | Vorganti | |
| 2018/0255027 A1 | 9/2018 | Winig et al. | |
| 2019/0014395 A1 | 1/2019 | Anand et al. | |
| 2019/0065349 A1* | 2/2019 | Sharma | G06F 11/3684 |
| 2019/0199654 A1 | 6/2019 | Pope et al. | |
| 2019/0222481 A1 | 7/2019 | Hira | |
| 2019/0260682 A1 | 8/2019 | Ewert | |
| 2020/0021512 A1 | 1/2020 | Naskar et al. | |

OTHER PUBLICATIONS

Hill et al., "Tracking network flows with P4" (Year: 2018).*

Commonly-assigned, co-pending U.S. Appl. No. 16/269,498 for "Methods, Systems, and Computer Readable Media for Providing Dynamically Configurable, Distributed Network Visibility Device," (Unpublished, filed Feb. 6, 2019).

"Sparkline," Wikipedia, https://en.wikipedia.org/wiki/Sparkline, pp. 1-3 (2019).

"The World's Fastest & Most Programmable Networks," Barefoot Networks, https://barefootnetworks.com/resources/worlds-fastest-most-programmable-networks/, pp. 1-10 (Feb. 6, 2019).

"P4Runtime Specification," The P4.org API Working Group, Version 1.0.0, pp. 1-97 (Jan. 29, 2019).

"P4Runtime Specification," The P4.org API Working Group, Version 1.0.0-rc4, pp. 1-72 (Jan. 25, 2019).

"Cubro Sessionmaster EXA48600," Cubro Network Visibility, pp. 1-5 (2019).

Commonly-assigned, co-pending U.S. Appl. No. 16/181,309 for "Methods, Systems, and Computer Readable Media for Testing Network Elements of an In-Band Network Telemetry Capable Network," (Unpublished, filed Nov. 5, 2018).

Rodriguez et al., "BB-Gen: A Packet Crafter for P4 Target Evaluation", SIGCOMM Posters and Demos '18, pp. 1-3 (Aug. 20-25, 2018).

Commonly-assigned, co-pending U.S. Appl. No. 16/035,534 for "Methods, Systems, and Computer Readable Media for Testing a Network Node Using Source Code," (Unpublished, filed Jul. 13, 2018).

Saha et al., "Fault Detection Effectiveness of Source Test Case Generation Strategies for Metamorphic Testing," MET, arXiv:1802.07361v1, pp. 1-8 (Feb. 20, 2018).

Nötzli, "p4pktgen: Automated Test Case Generation for P4 Programs," SOSR '18, pp. 1-7 (Mar. 28-29, 2018).

Anand, Madhukar et al., "POINT: An Intent-driven Framework for Intergrated Packet-Optical In-band Network Telemetry," Infinera Corporation, pp. 1-6 (2018).

Liang, Jianzhe et al., "In-band Network Function Telemetry," Tsinghua University, pp. 1-3 (Aug. 20-25, 2018).

Iša et al., "Verification of Generated RTL from P4 Source Code", 2018 IEEE 26th International Conference on Network Protocols, pp. 1-2 (2018).

"Test Case Management for Improved QA," Perforce, pp. 1-13 (2018).

"Cubro's network packet broker evolution," Cubro Blog, pp. 1-3 (Jan. 15, 2018).

McKeown et al., "P4 Runtime—Putting the Control Plane in Charge of the Fowarding Plane", The P4 Language Consortium, pp. 1-6 (Dec. 4, 2017).

P4(programminglanguage),Wikipedia,https://en.wikipedia.org/w/index/php?title=P4_(programming_language)&oldid=812348591, pp. 1-3 (Nov. 27, 2017).

"P416 Language Specification," The P4 Language Consortium, version 1.0.0, pp. 1-129 (May 22, 2017).

Hyun, Jonghwan et al., "Knowledge-Defined Networking using In-band Network Telemetry," Department of Computer Science and Engineering, POSTECH, pp. 1-4 (2017).

Van, Tu Nguyen et al., "Towards ONOS-based SDN Monitoring using In-band Network Telemetry," Department of Computer Science and Engineering, POSTECH, pp. 1-6. (2017).

Shahbaz et al., "PISCES: A Programmable, Protocol-Independent Software Switch," SIGCOMM'16, pp. 1-14 (Aug. 22-26, 2016).

Kim et al., "In-band Network Telemetry via Programmable Dataplanes," pp. 1-2 (2015).

Non-Final Office Action for U.S. Appl. No. 16/035,534 (dated Apr. 13, 2020).

Notice of Allowance and Fee(s) Due for U.S. Appl. No. 16/181,309 (dated Mar. 19, 2020).

Non-Final Office Action for U.S. Appl. No. 16/269,498 (dated Jan. 28, 2020).

Non-Final Office Action for U.S. Appl. No. 16/181,309 (dated Oct. 28, 2019).

Commonly-assigned, co-pending U.S. Appl. No. 16/446,318 for "Methods, Systems, and Computer Readable Media for Configuring a Test System Using Source Code of a Device Being Tested," (Unpublished, filed Jun. 19, 2019).

Zhang et al., "HyperVDP: High-Performance Virtualization of the Programmable Data Plane," IEEE Journal on Selected Areas in Communcations, vol. 37, No. 3, pp. 556-569 (Mar. 2019).

"Dynamic Test-Based P4 Packet Blaster Hardware Configuration," IPCOM000257013D, pp. 1-6 (Jan. 10, 2019).

"p4lang / switch," https://github.com/p4lang/switch, pp. 1-4 (Copyright 2019).

Anand et al., "POINT: An Intent-driven Framework for Integrated Packet-Optical In-band Network Telemetry," Infinera Corporation, pp. 1-6 (2018).

McKeown et al., "P4 Runtime—Putting the Control Plane in Charge of the Forwarding Plane," The P4 Language Consortium, pp. 1-6 (Dec. 4, 2017).

Papneja et al., "Basic BGP Convergence Benchmarking Methodology for Data-Plane Covergence," RFC 7747, pp. 1-35 (Apr. 2016).

Ginoza, "Request for Comments Summary RFC Numbers 2800-2899," RFC 2899, pp. 1-22 (May 2001).

Bradner et al., "Benchmarking Methodology for Network Interconnect Devices," RFC 2544, pp. 1-31 (Mar. 1999).

* cited by examiner

400

```
tables {
  preamble {
    id: 33592874
    name: "validate_outer_ipv4_packet"
    alias: "validate_outer_ipv4_packet"
  }
  match_fields {              ← 4-bit ternary match key on
    id: 1                        ipv4 "version" field
    name: "ipv4.version"
    bitwidth: 4
    match_type: TERNARY
  }
  match_fields {              ← 8-bit ternary match key on
    id: 2                        ipv4 "time to live" field
    name: "ipv4.ttl"
    bitwidth: 8
    match_type: TERNARY
  }
  match_fields {              ← 8-bit ternary match key on
    id: 3                        [part of] a 32-bit IPv4
    name: "ipv4.srcAddr"         source addr
    bitwidth: 8
    match_type: TERNARY
  }
  action_refs {               ← set_valid_outer_ipv4_packet
    id: 16807739
  }
  action_refs {               ← set_malformed_outer_ipv4_packet
    id: 16810983
  }
  action_refs {               ← THIS CAN BE IGNORED
    id: 16800567
    annotations: "@defaultonly"
    scope: DEFAULT_ONLY
  }
  size: 512                   ← size of the table = number of entries
}
```

```
actions {
  preamble {
    id: 16807739
    name: "set_valid_outer_ipv4_packet"
    alias: "set_valid_outer_ipv4_packet"
  }
} actions {
  preamble {
    id: 16810983
    name: "set_malformed_outer_ipv4_packet"
    alias: "set_malformed_outer_ipv4_packet"
  }
  params {
    id: 1
    name: "drop_reason"
    bitwidth: 8
  }
}
```

METHODS, SYSTEMS, AND COMPUTER READABLE MEDIA FOR TESTING A NETWORK NODE OR A RELATED APPLICATION PROGRAMMING INTERFACE USING SOURCE CODE METADATA

TECHNICAL FIELD

The subject matter described herein relates to testing devices. More specifically, the subject matter relates to methods, systems, and computer readable media for testing a network node or a related application programming interface (API) using source code.

BACKGROUND

Various tools and applications are available for configuring or programming network nodes (e.g., physical network nodes and/or virtual network nodes). One such tool is a programming language, named P4, usable for programming the data plane (e.g., data packet processing) of a network node e.g., a programmable network device. The P4 language is designed to be implementation- or target-independent, protocol independent, and field reconfigurable. For example, P4 source code can be compiled for many different types of targets, has no native support for network protocols, and allow operators to change the way a target (e.g., a central programming unit (CPU), a network processor, a field programmable gate array (FPGA), or an application specific integrated circuits (ASIC)) processes packets after deployment. However, issues can arise when utilizing the P4 language and similar tools. In particular, a network operator needs to be able to effectively test network nodes, including any P4 source code related functionality. While conventional test tools may be designed for hardware appliances with fixed functionality, such tools are not well-suited for testing network nodes with reconfigurable features, e.g., via the P4 programming language, since a P4 programmed device can have nearly arbitrary functionality and handle user-defined protocols.

Accordingly, in light of these difficulties, a need exists for improved methods, systems, and computer readable media for testing a network node or a related application programming interface (API) using source code metadata.

SUMMARY

Methods, systems, and computer readable media for testing a network node or a related application programming interface (API) using source code are disclosed. According to one method, the method occurs at a network equipment test device. The method includes receiving source code metadata derived from one or more source code files for programming a packet forwarding plane of a network node; analyzing the source code metadata to generate test metadata, wherein analyzing the source code metadata to determine the test metadata includes identifying source code metadata portions that indicate elements to test and determining the test metadata based on the elements; generating, using the test metadata, one or more test plans for testing the network node or an API associated with the network node; and testing the network node or the API using the one or more test plans.

According to one system, the system includes a network equipment test device. The network equipment test device includes at least one processor and memory. The network equipment test device is configured for: receiving source code metadata derived from one or more source code files for programming a packet forwarding plane of a network node; analyzing the source code metadata to generate test metadata, wherein analyzing the source code metadata to determine the test metadata includes identifying source code metadata portions that indicate elements to test and determining the test metadata based on the elements; generating, using the test metadata, one or more test plans for testing the network node or an API associated with the network node; and testing the network node or the API using the one or more test plans.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, each of the terms "function" and "module" refers to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIGS. 4A-4B depict example source code metadata; and

DETAILED DESCRIPTION

The subject matter described herein relates to methods, systems, and computer readable media for testing a network node or a related application programming interface (API) using source code. When testing one or more network nodes, it may be desirable to create a test or related workload such that the test is relevant to real-world scenarios and conditions.

In accordance with some aspects of the subject matter described herein, a network equipment test device or a related entity may generate test metadata (e.g., test plans, test variables and related test values, test conditions, test actions, etc.) for testing network equipment, e.g., a network node. For example, a network equipment test device may test a virtualized network function (VNF), such as a virtual switch, that is programmed or configured using one or more P4 source code files. In this example, the network equipment test device or a related entity may receive and analyze source code metadata (e.g., P4Info data) derived from or based on the P4 source code files to determine test metadata, e.g., the source code metadata may be analyzed to identify aspects for interacting with defined programming entities, e.g., tables, counters, meters, action profiles, and others. Continuing with this example, using the identified test metadata and/or related test plans (e.g., protocol templates, API templates, packet templates, flow templates, test templates, etc.), the network equipment test device or a related entity (e.g., a traffic generator) may generate test traffic for testing the network node and/or may generate API requests for testing a related API.

By using source code metadata to generate test metadata and/or related test plans, a network equipment test device in accordance with aspects described herein can facilitate setting up one or more tests for a network node quickly and efficiently without needing the corresponding source code. For example, by using source code metadata (e.g., P4Info data) of a target's program or source code to generate test metadata, a network equipment test device in accordance with aspects described herein can identify aspects of the program (e.g., tables, counters, meters, action profiles, etc.) to test and at least some values, ranges, or limits (e.g., length of addresses) to use for testing which can significantly reduce the amount of time needed for test configuration by a human operator and without requiring source code which may be unavailable and/or proprietary.

Reference will now be made in detail to example embodiments of the subject matter described herein, examples of which are illustrated in the accompanying drawings. Wherever possible, the same reference numbers will be used throughout the drawings to refer to the same or like parts.

Figure 1:
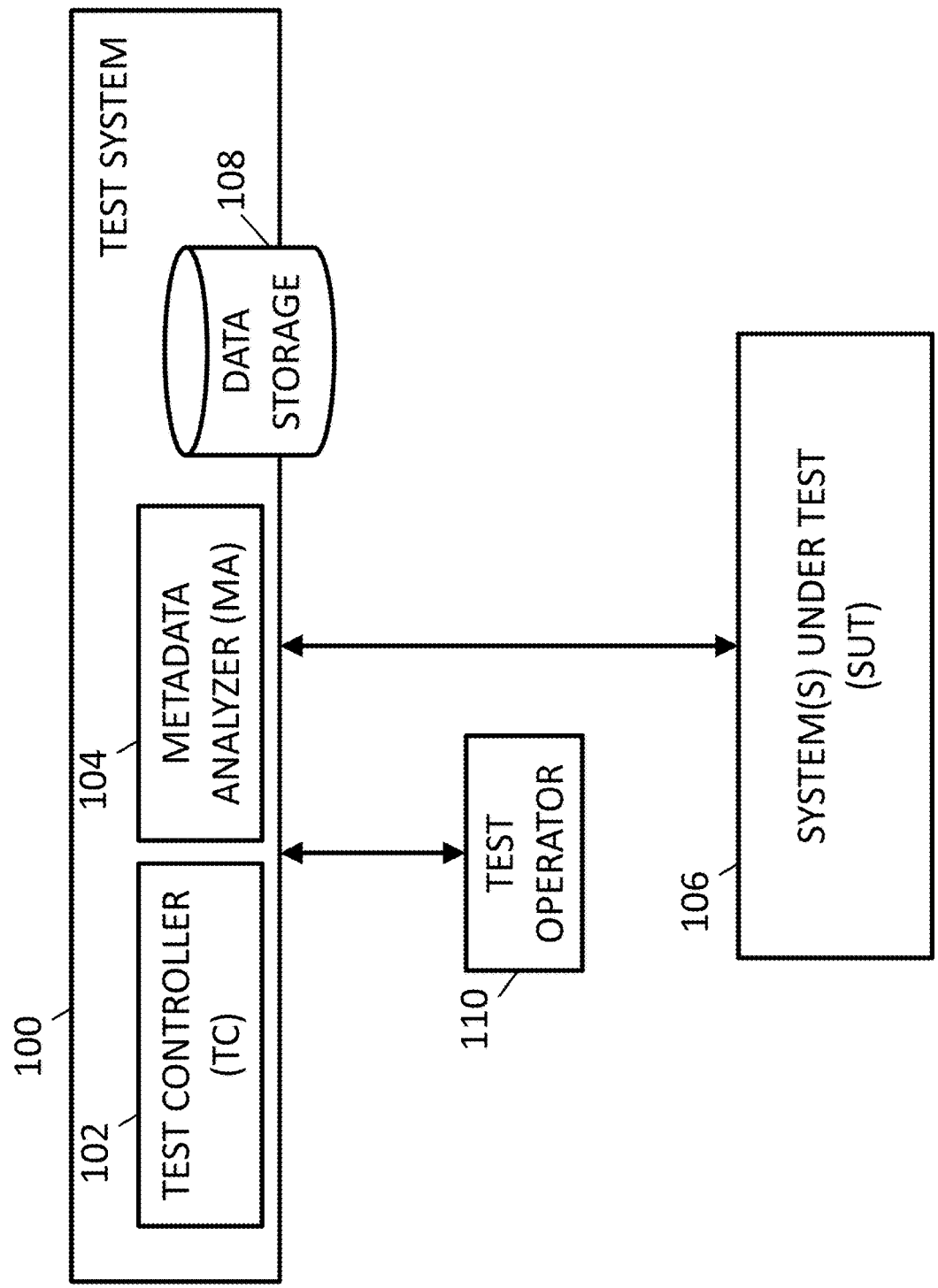
FIG. 1 is a diagram illustrating an example test system for testing a network node or a related application programming interface (API) using source code metadata.

FIG. 1 is a diagram illustrating an example test system 100 for testing a network node or a related API using source code metadata. Referring to FIG. 1, an example environment may include test system 100 and one or more device(s) and/or system(s) under test (SUT) 106. Test system 100 may represent any suitable entity or entities (e.g., one or more computing platforms, nodes, or devices) associated with testing SUT 106 (e.g., one or more security devices). For example, test system 100 may generate and send traffic (e.g., messages, packets, API requests, etc.) to SUT 106 and/or receive traffic from SUT 106 and may analyze one or more performance aspects associated with SUT 106.

SUT 106 may be any suitable entity or entities (e.g., devices, systems, or platforms) for receiving, processing, forwarding, and/or sending one or more messages (e.g., packets, API requests, etc.). In some embodiments, SUT 106 may include a network node, e.g., a network switch, a network router, a network interface card, a packet forwarding device, or one or more VNFs. For example, SUT 106 or a VNF thereof may be software and/or a VM executing on shared resources (e.g., compute, storage, and network resources in a cloud computing environment). In some embodiments, SUT 106 or related logic (e.g., rules associated with packet forwarding/processing) may be configured or programmed using one or more programming languages, e.g., the P4 language maintained by the P4 Language Consortium.

In some embodiments, test system 100 may include a stand-alone tool, a testing device, a network equipment test device or platform, or software executing on one or more processor(s). In some embodiments, test system 100 may be a single device or node or may be distributed across multiple devices or nodes. In some embodiments, test system 100 may include one or more modules for performing various test related functions. For example, test system 100 may include a traffic generator for generating test traffic and/or an analyzer for analyzing source code metadata associated with SUT 106 to identify or determine test metadata for testing SUT 106 or a related API.

Test system 100 may include a test controller (TC) 102, a metadata analyzer (MA) 104, and a data storage 108. TC 102 may be any suitable entity or entities (e.g., software executing on a processor, a field-programmable gateway array (FPGA), and/or an application-specific integrated circuit (ASIC), or a combination of software, an FPGA, and/or an ASIC) for performing one or more aspects associated with testing SUT 106, testing a related API, or various aspects thereof. In some embodiments, TC 102 may be implemented using one or more processors and/or memory. For example, TC 102 may utilize one or more processors (e.g., executing software stored in memory) to generate test messages (e.g., API requests or packets) for various message streams (e.g., flows or sessions). In another example, TC 102 may also utilize one or more processors to perform or initiate various tests and/or analyses involving test messages and/or related responses from SUT 106. In this example, TC 102 may send instructions to various modules or entities in test system 100 for controlling (e.g., pause, restart, or stop) a test session.

MA 104 may be any suitable entity or entities for performing one or more aspects associated with processing source code metadata or related files. In some embodiments, MA 104 may implement various functions using one or more processors and/or memory. For example, MA 104 may receive source code metadata from SUT 106 or another entity. In this example, MA 104 may analyze or inspect source code for generating test metadata (e.g., header field values, field names, field size, API data, or test conditions) usable for testing SUT 106. In some embodiments, MA 104 may identify particular source code metadata primitives or related metadata portions and use information therein to generate relevant test metadata for testing API processing, packet parsing and processing, data processing, or other actions defined in the source code.

In some embodiments, TC 102 and/or MA 104 may include one or more communications interfaces (e.g., one or more receive port modules and one or more transmit port modules) for interacting with users, modules, and/or nodes. For example, port modules may include network interface cards (NICs) or other suitable hardware, firmware, and/or software for receiving or transmitting data via ports (e.g., physical or logical communication end points).

In some embodiments, SUT 106, TC 102 and/or MA 104 may support one or more interfaces for requesting and receiving source code metadata or other information. For example, SUT 106 may be a production P4 device which supports P4Runtime (https://github.com/p4lang/p4runtime) and TC 102 and/or MA 104 may also support P4Runtime. In this example, MA 104 may include a controller that queries SUT 106 for its P4Info data using one or more API requests, e.g., a P4Runtime request. Continuing with this example, while providing P4Info data (e.g., via P4Runtime response), SUT 106 may be configured to not provide its source code and the vendor may not expose it since it contains proprietary intellectual property, e.g., custom code and/or algorithms.

In some embodiments, TC 102 and/or MA 104 may include or provide a communications interface for communicating with a test operator 110. In such embodiments, test operator 110 may be any entity (e.g., an automated system or a device or system controlled or controllable by a human user) for selecting and/or configuring various aspects associated with testing and/or generating testing related metrics. For example, user interfaces (e.g., an API and a graphical user interface (GUI)) may be provided for inputting or modifying configuration information, such as tests to be performed, types of metrics or statistics to be generated, and/or other settings.

In some embodiments, one or more user interfaces at test system 100 may support automation e.g., via one or more programming languages (e.g., python, TCL, Visual Basic, etc.), a representation state transfer (REST) API, a command line, and/or a web-based GUI. For example, test operator 110 may use a web browser to interact with a web-based GUI at TC 102 or MA 104 for programming or configuring one or more aspects for testing SUT 106.

In some embodiments, TC 102 or MA 104 may communicate with test system 100 and/or other related entities to receive test configuration information (e.g., test metadata) usable to set up and/or execute one or more test sessions. For example, test configuration information may be derived or obtained by analyzing P4 source code metadata files. In this example, the test configuration information may be used to generate test plans usable for generating and sending particular traffic and/or flows to SUT 106.

In some embodiments, TC 102, MA 104, and/or other entities in test system 100 may include functionality for accessing data storage 108 or other memory. Data storage 108 may be any suitable entity or entities (e.g., a storage device, memory, a non-transitory computer readable medium, or a storage system) for maintaining or storing information related to testing. For example, data storage 108 may store message capture related information, e.g., time delta information, timestamp related data, and/or other information. In this example, message capture related information may be usable to determine, derive, or compute one or more test related statistics, such time variation metrics for indicating scheduling fidelity.

In some embodiments, data storage 108 may also contain information usable for generating statistics and/or metrics associated with one or more aspects of SUT 106. For example, data storage 108 may contain metrics associated with one or more performance aspects of SUT 106 during one or more test scenarios. In this example, data storage 108 may maintain a particular set of computed metrics for a first test session or message stream and may maintain another set of computed metrics for a second test session or a different message stream. In some embodiments, data storage 108 and/or memory may be located at test system 100, another node, or distributed across multiple platforms or devices.

In some embodiments, test system 100 or one or more entities therein (e.g., TC 102 and/or MA 104) may be configured for analyzing source code metadata or related files associated with SUT 106 and for generating test metadata for testing SUT 106. For example, MA 104 may parse a P4Info file (e.g., a 'switch.p4.p4Info.proto' file) and may derive an API for interacting with a table or other entity at SUT 106 from the P4Info file. In this example, MA 104 may use this extracted or derived data to generate test metadata, which may be used to create test traffic (e.g., via a traffic generator) and/or to automatically generate one or more test plans for testing aspects of SUT 106, e.g., an API implementation.

In some embodiments, test system 100 or one or more entities therein (e.g., TC 102 and/or MA 104) may inspect source code metadata or related files associated with SUT 106 for identifying corner cases (e.g., scenarios that occur outside normal operating conditions) and using these identified corner cases to automatically add variations to one or more test plans to test the corner cases. For example, MA 104 may identify bit widths associated with various fields or input in a table and may identify a maximum table size. In this example, MA 104 may generate test metadata for configuring a test plan that tests whether an API request can add data to the table that exceeds bit widths or size limits.

In some embodiments, test system 100 or one or more entities therein (e.g., TC 102 and/or MA 104) may be configured to automatically identify and integrate "new protocols" defined in source code or related files for test configuration. For example, test system 100 (e.g., an IxNetwork test system) may include a configuration GUI that can parse test metadata generated from source code metadata. In this example, test system 100 or a related entity may identify a new protocol defined in the test metadata and may use the new protocol for configuring test traffic for testing SUT 106. Continuing with this example, test system 100 or a related entity may invoke properly configured traffic generators to generate test traffic, variations in test traffic, statistics, and flow tracking usable for testing SUT 106 based on the new protocol and/or other test metadata derived from the source code metadata.

In some embodiments, test system 100 or one or more entities therein (e.g., TC 102 and/or MA 104) may be configured to monitor performance of SUT 106 and/or display performance metrics to test operator 110. For example, test system 100 may include network interface cards or receive ports therein for observing responses to test packets from SUT 106. In this example, the receive ports may be configured to perform or monitor various metrics or statistics (e.g., packet loss, latency, jitter, etc.) based on one or more user- or system-defined tracking header fields. Continuing with this example, statistics, performance metrics, and/or other data associated with testing SUT 106 may be provided or displayed to test operator 110 via a GUI or other interface.

In some embodiments, test system 100 or another entity (e.g., MA 104) may generate a number of test plans (e.g., protocol templates, packet templates, flow templates, test templates, etc.) or related information. For example, MA 104 or another entity may generate test plans that are based on possible combinations of protocol headers or API requests derived using a source code metadata file (e.g., a P4Info file). In this example, MA 104 or another entity may utilize one or more heuristics along with predetermined logic and/or historical data to identify relevant test plans, e.g., by looking up a data structure containing associations between some metadata portions or related test metadata and one or more test plans.

In some embodiments, test system 100 or another entity (e.g., MA 104) may generate one or more test plans for testing SUT 106 with valid values (e.g., parameter field values) and may also generate one or more test plans for testing SUT 106 with invalid values.

In some embodiments, test system 100 or another entity (e.g., MA 104) may generate or include source file metadata and/or other information in test plans. For example, when generating a test plan based on a P4Info file, MA 104 or another entity may include P4Info file information, P4Info file date, a version number, etc. in the test plan.

In some embodiments, a test plan may also include a plan description and a summary of how the plan relates to a test case (e.g., condition or scenario being tested). For example, a test plan may include useful information to distinguish a plan with invalid header field values from a test plan with valid header field values. In another example, a test plan may include topology information discovered or derived from a P4 source code metadata file and various data emitted by MA 104 or a related compiler, e.g., a source code metadata file name, a date of import, a version number of a test tool, etc.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity.

Figure 2:
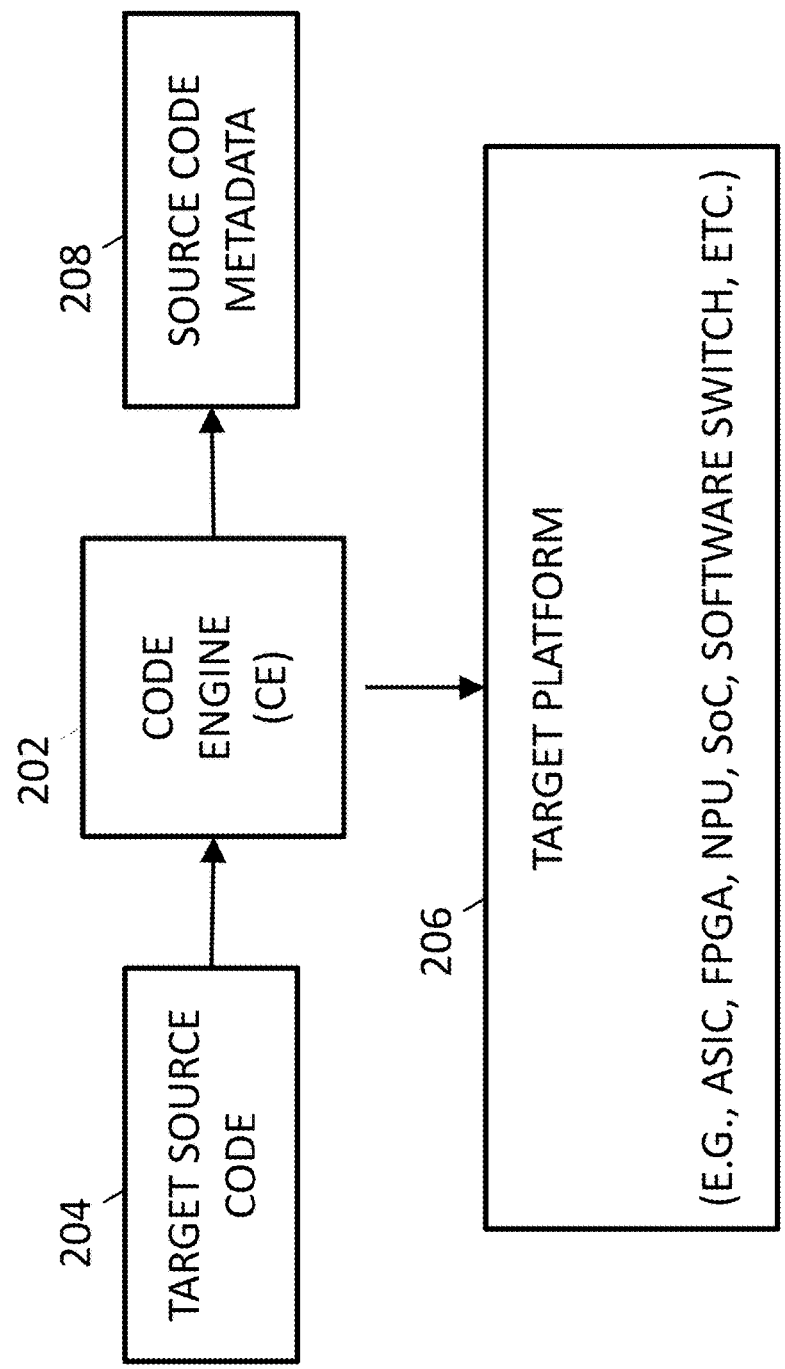
FIG. 2 is a diagram illustrating an example code engine (CE) for processing source code and generating source code metadata.

FIG. 2 is a diagram illustrating an example environment 200 for processing source code for programming SUT 106. Referring to FIG. 2, code engine (CE) 202 may be any suitable entity or entities for performing one or more aspects associated with processing source code or related source code files. In some embodiments, CE 202 may implement various functions using one or more processors and/or memory. In some embodiments, CE 202 may be separate or external to test system 100 or may be integrated with test system 100 or entities therein.

In some embodiments, CE 202 may include functionality for processing source code and/or related files, e.g., target source code 204. Source code 204 may represent source code for programming one or more aspects of a network node, e.g., a router, a switch, a network interface card, a programmable network device, or a VNF. For example, source code 204 may be one or more P4 source code files for programming a router and/or its related data plane (e.g., how it processes and routes packets). In another example, source code 204 may be one or more P4 source code files for programming a switch and/or its related data plane (e.g., how it processes and switches packets).

In some embodiments, source code 204 may include files written in one or more versions of P4, e.g., P4 version 14 (P4-14) or version 16 (P4-16). For example, CE 202 may include or utilize a P4 compiler distribution called "p4c" which includes compilers and example programs written in P4-14 and P4-16 for various p4 "software" targets including bmv2 (behavioral model 2). In an example "p4c" distribution, a file name 'switch.p4' may be representative of the data plane functionality of production-grade layer2/layer3 datacenter switches.

In some embodiments, CE 202 may include functionality for validating source code and/or related file formats (e.g., P4 source code files). For example, CE 202 may validate that source code 204 is from an authorized source and/or may confirm that source code 204 can be interpreted or compiled into valid machine code for execution. In this example, CE 202 may notify a network operator and/or may store various details if errors are found in the source code or other issues are detected.

In some embodiments, CE 202 may include functionality for compiling and/or interpreting source code into machine code, byte code, or other code (e.g., intermediate code) for implementation or executing at a target platform 206. For example, CE 202 may compile or interpret P4 source code into a JavaScript Object Notation (JSON) formatted behavioral model usable by a C++ implemented software switch (e.g., bmv2).

In some embodiments, CE 202 may generate source code metadata 208 before, during, or after CE 202 compiles or processes source code 204. For example, CE 202 may generate one or more P4Info files that provide a machine-readable metadata description of a P4-capable device's control-plane API and/or other elements. In this example, CE 202 may include the P4Info files (e.g., a 'switch.p4.p4info.proto' file) along with P4 source code (e.g., a 'switch_16.p4' file') or compiled code to target platform 206, an operator, or another entity.

Target platform 206 may represent various entities for executing source code or related logic (e.g., compiled machine code). For example, target platform 206 may include a general-purpose network programming unit (NPU) (e.g., a network processor), a computer programming unit (CPU), a field programmable gate array (FPGA), a software switch (e.g., executing on one or more general processors), a system-on-chip (SoC), or an application specific integrated circuit (ASIC). In some embodiments, target platform 206 may require a compiler (e.g., software embedded in target platform 206 or CE 202) for mapping or converting P4 code into byte or machine code that represents a target machine model. In this example, the byte or machine code generated will be dependent on target platform 206.

In some embodiments, source code metadata 208 can provide useful information for testing a DUT without having access to its original P4 source code (because it's proprietary), simply by having test system 100 or a related entity (e.g., MA 104) requests P4info data from target platform 206 or another entity via a P4Runtime API or related P4Runtime client.

In some embodiments, CE 202 may include functionality for analyzing source code metadata 208 and/or related files (e.g., source code 204) to identify code portions that are usable for deriving or obtaining test metadata. For example, CE 202 may include a test metadata generator that obtains and/or derives test metadata based on certain keywords or code sections. In this example, the test metadata may be used test system 100 or another entity to generate test plans and/or related test packets for testing SUT 106.

In some embodiments, CE 202 may communicate directly or indirectly with test system 100 and/or MA 104. For example, source code metadata 208 and/or other information generated by CE 202 may be sent to MA 104 for processing via CE 202, target platform 206, a management node, or an operator. In this example, target platform 206 may represent SUT 106 and may include functionality for communicating source code metadata 208 to test system 100 or a related entity (e.g., TC 102, MA 104, etc.) via a P4Runtime API.

It will be appreciated that FIG. 2 is for illustrative purposes and that various nodes, their locations, and/or their functions described above in relation to FIG. 2 may be changed, altered, added, or removed. For example, some nodes and/or functions may be combined into a single entity. For example, in some embodiments, CE 202 may be integrated with MA 104.

Further, while FIG. 2 discloses source code 204, it will be appreciated that other source code files may be usable for programming a programmable network device or VNF, e.g., a load balancing function, an intrusion detection function, an intrusion protection function, an antivirus function, an anti-spam function, a firewall function, a switching function, or a routing function.

Figure 3:
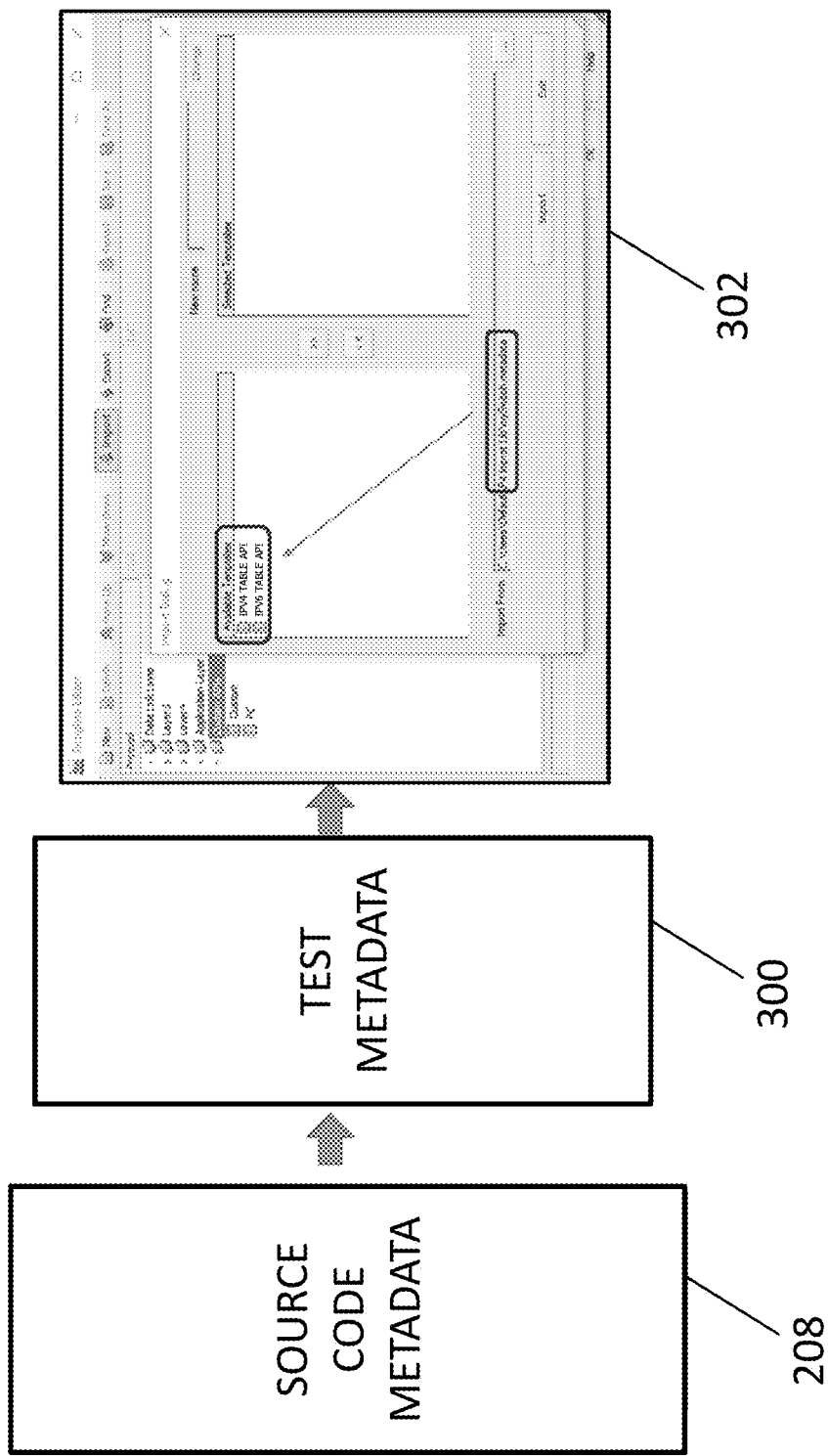
FIG. 3 is a diagram illustrating an example user interface for importing test metadata derived from source code metadata.

FIG. 3 is a diagram illustrating an example user interface 302 for importing test metadata 300 derived from source code metadata 208. In some embodiments, e.g., where test system 100, TC 102, MA 104, and/or another entity includes or incorporates a source code compiler, source code metadata 208 may be imported directly into test system 100. In some embodiments, source code metadata 208 may be imported into test system 100 after source code metadata 208 is received from SUT 106 via a P4Runtime API or another interface. After source code metadata 208 is imported into test system 100, test metadata 300 may be generated using (e.g., derived from) source code metadata 208 by test system 100 or an entity therein (e.g., MA 104).

In some embodiments, test system 100, TC 102 and/or another entity may include user interface 302 for configuring a test session or related aspects (e.g., a test plan). For example, after MA 104 analyzes source code metadata 208 and derives and/or generates test metadata 300, test operator 110 may select one or more files containing test metadata 300 via user interface 302. In this example, after importing test metadata 300 into TC 102 using user interface 302, test operator 110 may use a test plan configuration GUI (e.g., a template editor) to modify or change a test plan that defines test traffic to send to SUT 106 during a test session. In another example, test system 100 and/or MA 104 may receive and analyze source code metadata 208, generate test metadata 300, and automatically import and/or use test metadata 300 for creating or modifying a test plan or for performing other test related configuration in test system 100.

In some embodiments, test system 100 or a related entity (e.g., MA 104) may analyze source code metadata 208 for relevant code portions usable to generate test metadata 300. For example, test system 100 or a related entity (e.g., MA 104) may be configured to identify and inspect fields or data structures in metadata code portions (e.g., a Table portion, a Counter portion, a DirectCounter portion, a Meter portion, a DirectMeter portion, a ControllerPacketMetadata portion, a ValueSet portion, a Register portion, a Digest portion, an Extern portion, a preamble portion, an annotations portion, a match fields portion, an action references portion, and/or other portions) and may use these to determine test conditions and/or elements to be tested. In another example, test system 100 may identify and inspect code portions in source code metadata 208 and may use data therein to identify test conditions and/or determine values of API data for test metadata 300.

Test metadata 300 may represent data usable for configuring or defining a test plan for testing SUT 106. For example, test metadata 300 may include various data regarding two tables described or mentioned in source code metadata 208. In this example, test metadata 300 may include field names, bit width or sizes of data to lookup or store, and Boolean values indicating whether the values are to be validated or tested.

User interface 302 can allow test metadata 300 derived from source code metadata 208 to be imported. For example, after MA 104 analyzes source code metadata 208, generates test metadata 300 derived from source code metadata 208, and creates a metadata file containing test metadata 300, test operator 110 can input the file name (e.g., 'switch.metadata') of the metadata file in an import dialog of a template editor GUI, e.g., of test system 100 or a related entity (e.g., TC 102). In this example, once a file name is inputted, test system 100 or a related entity may inspect the file for available protocol templates in the test metadata 300. In another example, test system 100, TC 102, or another entity (e.g., MA 104) may generate and utilize test metadata 300 automatically in test system 100. In this example, prior to test metadata 300 being automatically generated and imported, test operator 110 may use user interface 302 or another user interface for selecting source code metadata files from which test metadata 300 is derived or obtained.

In some embodiments, test system 100 or a related entity (e.g., TC 102) may generate and use API templates based on test metadata 300 and/or use imported API templates to configure test plans or related information for a traffic generator and/or other testing entities. For example, test system 100 or a related entity may generate test traffic for testing SUT 106 based on test metadata 300 that indicates valid and/or invalid (e.g., malformed) data and/or valid or malformed API requests based on the imported API templates.

It will be appreciated that FIG. 3 is for illustrative purposes and that various aspects described above in relation to FIG. 3 may be changed, altered, added, or removed. For example, some user interface elements and/or features described in FIG. 3 may be removed or modified.

FIGS. 4A-4B depict example source code metadata 400-402 for converting between data formats. Source code metadata 400-402 may include information related to programming objects or entities and/or information for interacting with the entities, e.g., API related information.

In some embodiments, source code metadata 400-402 may include P4Info data. In some embodiments, the P4Info data may provide a machine-readable metadata description of a P4-capable device's control-plane API. For example, P4Info data may list and describe every P4 entity (e.g., P4 object) which can be read or written to by a controller. Some example P4 entities may include tables, counters, meters, action profiles, digests, externs, and others. Additional details regarding P4, P4 objects, and/or related P4Info portions are disclosed in the P4Runtime Specification, version 1.0.0, by the P4.org API Working Group dated Jan. 29, 2019; the disclosure of which is incorporated herein by reference.

Referring to FIG. 4A, source code metadata 400 includes an example portion of P4Info data (e.g., from a P4 file, like 'switch.p4.p4info.txt) for a "validate_outer_ipv4_packet" table. Source code metadata 400 may include information related to a table, including for, example, source code portion, e.g., a 'tables' portion, a 'preamble' portion, an 'annotations' portion, a 'match_fields' portion, or an 'action_refs' portion. Each source code metadata portion may be related to characteristics or details regarding one or more aspect of the table or interaction therewith. Each source code metadata portion may include various fields and/or metadata primitives with values, e.g., 'name', 'id', 'bitwidth', 'match_type', 'annotations', 'scope', or 'alias' values.

Source code metadata 400 indicates that the described table name is 'validate_outer_ipv4_packet'. MA 104 or another entity may be configured to heuristically or algorithmically infer that SUT 106 accepts IPv4 packets and infer that some form of validation (e.g., accept/reject logic) is performed on them. MA 104 or another entity may be configured to heuristically or algorithmically infer that the term "outer" (and also "inner" on another table) implies usage of tunnel protocols.

Source code metadata 400 also indicates that the described table size is '512'. In the P4 world this has an inexact meaning when the table contains ternary match keys. Source code metadata 400 also indicates that the described table contains three ternary match keys.

Source code metadata 400 also indicates that the described table can execute one of two actions: 'set_valid_outer_ipv4_packet' or 'set_malformed_outer_ipv4_packet'. These are indicated by the numerical 'action_refs' id values of source code metadata 400; the corresponding actions are shown in metadata 402 in FIG. 4B. It will be appreciated that the third entry with annotation @defaultonly may be ignored by MA 104 as an artifact of the particular compiler. In some embodiments, MA 104 or another entity may be configured to heuristically or algorithmically infer that the 'action name' refer to one or more behaviors, e.g., valid" and malformed" are indicative of accept and reject logic, respectively.

In some embodiments, test system 100 or a related entity may test table size to ensure SUT 106 actually supports the stated number of entries or if not, how many it does support. In some embodiments, test system 100 may be aware of that ternary match keys can consume different numbers of resources (TCAM/hash table) on a device depending upon the implementation and the nature of the entries including their values and the order in which previous entries have been added or deleted and, as such, test system 100 or a related entity may generate test plans accordingly.

Referring to FIG. 4B, source code metadata 402 indicates the two actions mentioned above, 'set_valid_outer_ipv4_packet' and 'set_malformed_outer_ipv4_packet'. In the left-most 'actions' portion of source code metadata 402, the action includes an id of '16807739' and a name of set_valid_outer_ipv4_packet and contains zero parameters. In some embodiments, MA 104 or another entity may be configured to heuristically or algorithmically infer (e.g., using the name) that the purpose of this action is to accept a packet which contains an outer IPv4 header.

In the right-most 'actions' portion of source code metadata 402, the action includes an id of '16810983' and a name of 'set_malformed_outer_ipv4_packet' and contains one, 8-bit parameter: drop_reason. In some embodiments, MA 104 or another entity may be configured to heuristically or algorithmically infer (e.g., using the name of the action and parameter) that the purpose of this action is to drop a packet if the packet contains known bad content or is malformed (e.g., according to defined IPv4 protocol) and the parameter will indicate the reason the packet was dropped.

In some embodiments, MA 104 or a related entity may interpret or derive test metadata and/or test plans using explicit content and intentions of source code metadata 400-402. For example, MA 104 or a related entity may generate a test plan for testing the table's API based on the P4Runtime specification and interpretation of the P4Info data without any attempt to understand the P4 program's functionality.

In some embodiments, MA 104 or a related entity may test conformance of a network node or a related API, e.g., a table API described in source code metadata 400-402. In some embodiments, conformance testing may include test plans that create table entries with every possible combination (or a significant portion thereof) of table key and action and confirm that SUT 106 accepts them. In such embodiments, conformance test may involve changing the keys (e.g., value+ternary masks), the action refs, and for each action with parameters, varying the parameter values and permutations (for actions with more than one parameter).

In some embodiments, test plans may be based at least in part on the testing environment and/or communications interfaces being used. For example, if using P4runtime, test plans may control TC 102 to generate table entry combinations by creating just one entry, then modifying it (e.g., either in-place, or by first deleting then recreating it).

In some embodiments, MA 104 or a related entity may test performance a network node or a related API, e.g., a table API described in source code metadata 400-402. In some embodiments, performance testing may include test plans that test the speed at which SUT 106 accepts read, modify and write requests for table entries. In such embodiments, TC 102 or another entity may monitor SUT 106 to determine whether SUT 106 suffers control or management plane degradation due to using the P4Runtime API.

In some embodiments, e.g., prior to, during, or after testing a P4 entity (e.g., a table), TC 102 or a related entity may test a P4Runtime API or implementation at SUT 106. Example P4Runtime related test plans may be generated and used that test simultaneous access, e.g., speed and robustness, to SUT 106 from different controllers (e.g., test system 100 may emulate the different controllers), that verify the arbitration and correctness of multiple controllers including role negotiation; that verify "service request" (e.g., gRPC command/response) functions as expected for both good and intentionally bad input, that measure the performance of the P4Runtime interface (e.g., speed of back-to-back requests, large bulk requests, etc.), that tests the maximum message sizes by trial-and-error (e.g., protobuf message formats may contain "repeated" clauses which mean that multiple elements of a given kind can appear but there are not maximum numbers given).

In some embodiments, e.g., where test system 100 does not have access to actual source code of SUT 106, test system 100 and related entities may lack information about the data plane, e.g., the packet formats and protocols it supports and the expected behavior. In such embodiments, e.g., where to functionally test a P4-capable device, test system 100 or related entity programs the control plane of using P4Runtime or another interface, send packets into SUT 106, and receive packets from SUT 106, test system 100 or related entities may utilize various sources (e.g., predetermined logic and manufacturer documentation) for heuristically or algorithmically inferring expected behavior and capabilities of SUT 106 for testing purposes.

In some embodiments, MA 104 or a related entity may be configured for inspecting object names (of tables, actions, and parameters) and/or other values in metadata 400-402 and recognizing meaningful words and abbreviations, e.g., using pattern-matching techniques, that corresponding to predetermined behavior patterns, test plans, or implicit objects or effects.

In some embodiments, MA 104 or another entity may be configured to heuristically or algorithmically infer that the terms 'inner_ipv4', 'outer_ipv4', 'inner_ipv6', and/or 'outer_ipv6' indicates that SUT 106 can switch packets containing both outer and inner ipv4 or ipv6 protocol headers, which also may indicate the usage of tunneled protocols since the term 'inner' implies tunnels are used.

In some embodiments, MA 104 or another entity may be configured to heuristically or algorithmically infer that the term 'mpls[0].label, mpls[1].label, mpls[2].label' indicates that SUT 106 can switch MPLS protocol stacks up to three levels deep and that the term 'vlan_tag_[0].vid, vlan_tag_[1].vid' indicates SUT 106 can switch virtual local area network (VLAN) tags up to two levels deep.

In some embodiments, test system 100 or a related entity (e.g., MA 104) may use and/or maintain a term data store containing associations of familiar (e.g., historically known or identified) terms and variations of those terms with standardized test plans for sending and receiving packets with various protocol layers, e.g., based on source code metadata 400-402.

In some embodiments, test system 100 or a related entity (e.g., MA 104) may utilize a 'test wizard' user interface for presenting a list of candidate protocols (e.g., based at least in part on the information in a term data store) and for allowing the user to add, delete, or select from the list. In some embodiments, some terms (e.g., interesting-looking symbols) extracted from source code metadata 400-402 but which were not automatically matched to protocols or test plans could be presented to the user and the user could use their own knowledge or intuition to pick an associated protocol or test plan. In such embodiments, user-inputted binding may be added to the term data store for future usage and/or to improve future heuristics or inference algorithms.

It will be appreciated that metadata 400-402 is for illustrative purposes and that different and/or additional data than the data depicted in FIGS. 4A-4B may be usable for deriving test metadata 300, test plans, or other information. Further, it will be appreciated that P4 objects or entities described herein are illustrative and that additional and/or different objects may be identified or described in metadata 400-402, e.g., as the P4 specification changes in subsequent versions. Furthermore, metadata 200-202 may be stored (e.g., in data storage 108) or managed using various data structures and/or computer readable media.

Figure 5:
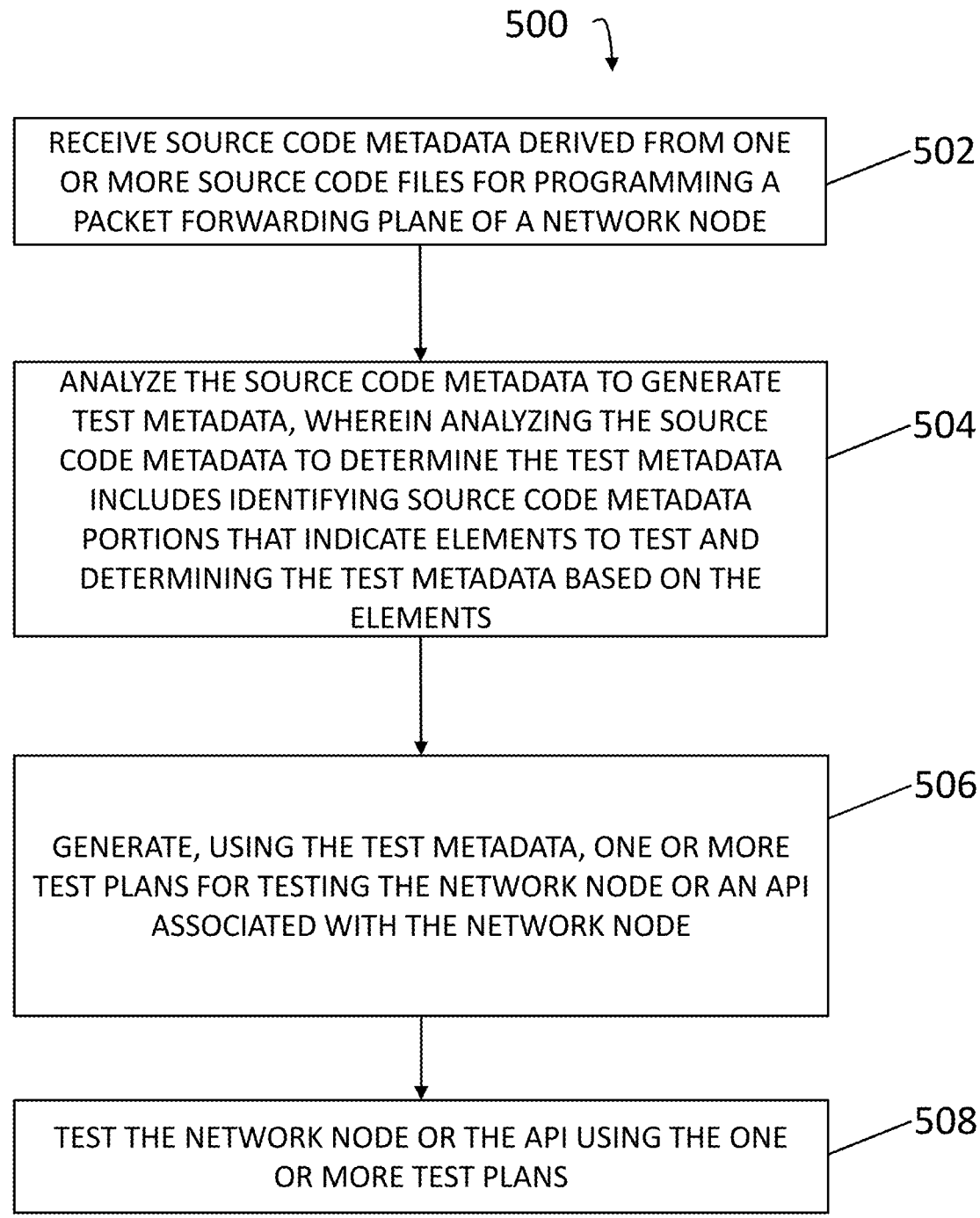
FIG. 5 is a diagram illustrating an example process for testing a network node or a related API using source code metadata.

FIG. 5 is a diagram illustrating an example process for testing a network node or a related API using source code metadata. In some embodiments, example process 500, or portions thereof, may be performed by or at test system 100 (e.g., a network equipment test device), TC 102, MA 104, and/or another node or module.

At step 502, source code metadata derived from one or more source code files for programming a packet forwarding plane of a network node may be received. For example, P4 source code metadata files for describing various programming structures or entities associated with a network node may be received by MA 104. In some embodiments, the network node may include a router, a switch, a programmable network device, or a VNF. In some embodiments, the source code metadata may include P4Info code.

In some embodiments, source code metadata may be received via a P4Runtime API. For example, source code metadata 208 may be sent from SUT 106 to test system 100 or a related entity via a P4Runtime API.

At step 504, the source code metadata may be analyzed to generate test metadata, wherein analyzing the source code metadata to determine the test metadata includes identifying source code metadata portions that indicate elements to test and determining the test metadata based on the elements. For example, test system 100 or a related entity (e.g., MA 104) may be configured to identify parameters and/or boundaries associated with an IP address lookup table. In this example, the test metadata generated may include value ranges, table details, and/or API request structure information usable for generating one or more test plans.

In some embodiments, source code metadata may include API related structure information, table information, counters information, meter information, action profile information.

In some embodiments, source code metadata portions may include a Table portion, a Counter portion, a DirectCounter portion, a Meter portion, a DirectMeter portion, a ControllerPacketMetadata portion, a ValueSet portion, a Register portion, a Digest portion, an Extern portion, a preamble portion, an annotations portion, a match fields portion, or an action references portion.

In some embodiments, elements to test may include a table size, a protocol structure, a data entry size, a validation or accept rule, an invalidation or reject rule, or a user defined element.

In some embodiments, determining test metadata based on elements to be tested may include using historical information, predetermined logic, or at least one heuristic. For example, TC 102, MA 104, or a related entity may maintain and use a large catalog of familiar terms and variations that are found in source code metadata 208 and that are associated ("bound") with standardized tests for sending and receiving packets with various protocol layers, e.g., based on what information derived from source code metadata 208.

At step 506, one or more test plans may be generated for testing the network node or an API associated with the network node. For example, a test plan may be used by test system 100 or related entity (e.g., packet or API request generator) to indicate test traffic that is to be sent to SUT 106. In this example, the test plan may indicate or define various aspects of a test session, including, for example, a number of media streams or API streams, how packet header values or API request values are to be determined (e.g., based on a specified pattern, value range, or selection mode), and what fields and/or statistics are to be tracked or recorded during a test session.

At step 508, the network node or the API may be tested using the one or more test plans. In some embodiments, one of the one or more test plans may test the network node or the API for conformance with a predefined standard or for performance or speed.

In some embodiments, the network equipment test device may include a source code compiler (e.g., CE 202), wherein the source code compiler converts source code in the one or more source code files into logic for implementing the packet forwarding plane of the network node, wherein the source code compiler sends the logic to the network node for execution.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for testing using source code metadata, the method comprising:
at a network equipment test device:
receiving source code metadata derived from one or more source code files for programming a packet forwarding plane of a network node;
analyzing the source code metadata to generate test metadata, wherein analyzing the source code metadata to determine the test metadata includes identifying source code metadata portions that indicate elements to test and determining the test metadata based on the elements;
generating, using the test metadata, one or more test plans for testing the network node or an application programming interface (API) associated with the network node; and
testing the network node or the API using the one or more test plans.

2. The method of claim 1 wherein the source code metadata includes P4 programming language information (P4info) data.

3. The method of claim 1 wherein the network node includes a router, a switch, a network interface card, a programmable network device, or a virtualized network function (VNF).

4. The method of claim 1 wherein the source code metadata is received via a P4Runtime API.

5. The method of claim 1 wherein the source code metadata include API related structure information, table information, counters information, meter information, action profile information.

6. The method of claim 1 wherein the source code metadata portions include a Table portion, a Counter portion, a DirectCounter portion, a Meter portion, a DirectMeter portion, a ControllerPacketMetadata portion, a ValueSet portion, a Register portion, a Digest portion, an Extern portion, a preamble portion, an annotations portion, a match fields portion, or an action references portion.

7. The method of claim 1 wherein the elements to test include a table size, a protocol or API structure, a data entry size, a validation or accept rule, an invalidation or reject rule, or a user defined element.

8. The method of claim 1 wherein determining the test metadata based on the elements includes using historical information, predetermined logic, or at least one heuristic.

9. The method of claim 1 wherein one of the one or more test plans test the network node or the API for conformance with a predefined standard or for performance or speed.

10. A system for testing using source code metadata, the system comprising:
at least one processor;
at least one memory; and
a network equipment test device implemented using the at least one processor and the at least one memory, wherein the network equipment test device is configured for:
receiving source code metadata derived from one or more source code files for programming a packet forwarding plane of a network node;
analyzing the source code metadata to generate test metadata, wherein analyzing the source code metadata to determine the test metadata includes identifying source code metadata portions that indicate elements to test and determining the test metadata based on the elements;
generating, using the test metadata, one or more test plans for testing the network node or an application programming interface (API) associated with the network node; and
testing the network node or the API using the one or more test plans.

11. The system of claim 10 wherein the source code metadata includes P4 programming language information (P4info) data.

12. The system of claim 10 wherein the network node includes a router, a switch, a network interface card, a programmable network device, or a virtualized network function (VNF).

13. The system of claim 10 wherein the source code metadata is received from the network via a P4Runtime API.

14. The system of claim 10 wherein the source code metadata include API related structure information, table information, counters information, meter information, action profile information.

15. The system of claim 10 wherein the source code metadata portions include a Table portion, a Counter portion, a DirectCounter portion, a Meter portion, a DirectMeter portion, a ControllerPacketMetadata portion, a ValueSet portion, a Register portion, a Digest portion, an Extern portion, a preamble portion, an annotations portion, a match fields portion, or an action references portion.

16. The system of claim 10 wherein the elements to test include a table size, a protocol or API structure, a data entry size, a validation or accept rule, an invalidation or reject rule, or a user defined element.

17. The system of claim 10 wherein determining the test metadata based on the elements includes using historical information, predetermined logic, or at least one heuristic.

18. The system of claim 10 wherein one of the one or more test plans test the network node or the API for conformance with a predefined standard or for performance or speed.

19. A non-transitory computer readable medium comprising computer executable instructions embodied in the computer readable medium that when executed by at least one processor of a computer perform steps comprising:
receiving source code metadata derived from one or more source code files for programming a packet forwarding plane of a network node;
analyzing the source code metadata to generate test metadata, wherein analyzing the source code metadata to determine the test metadata includes identifying source code metadata portions that indicate elements to test and determining the test metadata based on the elements;
generating, using the test metadata, one or more test plans for testing the network node or an application programming interface (API) associated with the network node; and
testing the network node or the API using the one or more test plans.

20. The non-transitory computer readable medium of claim 19 wherein the source code metadata includes P4 programming language information (P4info).

* * * * *